United States Patent [19]

Dumesnil et al.

[11] 4,251,595
[45] Feb. 17, 1981

[54] LOW TEMPERATURE SEALING GLASSES

[75] Inventors: Maurice E. Dumesnil, Palo Alto; Ulrich Schreier, San Francisco, both of Calif.

[73] Assignee: Technology Glass Corporation, Sunnyvale, Calif.

[21] Appl. No.: 74,012

[22] Filed: Sep. 10, 1979

Related U.S. Application Data

[63] Continuation-in-part of Ser. No. 901,467, May 1, 1978, Pat. No. 4,186,023.

[51] Int. Cl.$^3$ .................. B32B 17/06; B32B 15/04; C03C 3/10
[52] U.S. Cl. ..................... 428/426; 106/47 R; 106/53; 428/428; 428/432
[58] Field of Search ............... 106/47 R, 49, 53; 428/426, 432, 428

[56] References Cited

U.S. PATENT DOCUMENTS

| 3,250,631 | 5/1966 | Lusher | 106/47 R |
| 3,485,648 | 12/1969 | Bishop | 106/53 |
| 4,002,799 | 1/1977 | Dumesnil et al. | 106/47 R |
| 4,004,936 | 1/1977 | Powell | 106/53 |
| 4,115,132 | 9/1978 | Suzuki et al. | 106/53 |

*Primary Examiner*—O. R. Vertiz
*Assistant Examiner*—Mark Bell
*Attorney, Agent, or Firm*—Limbach, Limbach & Sutton

[57] ABSTRACT

Lead borate and lead zinc borate glasses containing from 0.1 to 10% by weight cuprous oxide ($Cu_2O$) and fluoride, the molar ratio of cuprous oxide to fluoride being in the range 1:0.25 to 1:10, preferably in the range 1:1 to 1:5, up to 5% by weight bismuth oxide and from 0.1 to 5.0% alumina are disclosed. These glasses are mixed with particulate lead titanate in amounts up to about 56% by volume. These mixtures have very low coefficients of thermal expansion and are useful for bonding ceramic, glass and metal parts together at low temperatures. They are especially useful as semiconductor package sealants.

7 Claims, No Drawings

LOW TEMPERATURE SEALING GLASSES

RELATED APPLICATION

This application is a continuation-in-part of application Ser. No. 901,467 filed May 1, 1978 now U.S. Pat. No. 4,186,023 issued Jan. 29, 1980.

BACKGROUND OF THE INVENTION

In the semiconductor industry, semiconductor materials such as silicon are hermetically sealed in ceramic packages. The function of the package is to provide a protective container for the silicon device.

In the past relatively high temperature sealing glasses of the lead zinc borate type have been employed in packaging. The more successful sealing glasses have been based on $PbO:ZnO:B_2O_3$ in which the components are present at 2:1:1 mol ratios. These lead zinc borate glasses have been modified by the addition of minor amounts of other materials such as silicon dioxide, barium oxide and tin oxide. In the course of use glasses of this type have been thermally devitrified to reduce their thermal expansion. During devitrification the glass is converted from a solid solution to a rigid crystalline skeleton associated with a vitreous matrix characterized by reduced thermal expansion. Thermal expansion can be further reduced and the mechanical strength of the glass can be further increased by the addition of a small amount of a low expansion inert ceramic powder.

The devitrification may be carried out by maintaining the glass at a temperature about 430° C. for a period of about an hour or longer. While these sealing conditions are acceptable in some environments, in the production of ceramic packages long exposure to high temperatures must be avoided and in order to obtain the high glass fluidity required for a proper seal without long high temperature exposure the glasses are commonly subjected to temperatures in the range of 480° to 530° C. for 8 to 12 minutes to complete the seal.

The requirement of a devitrification step during the sealing of ceramic packages with the glasses above described makes the employment of times and temperatures during the sealing process of the order of those described above necessary.

It is an object of this invention to provide sealing glasses which do not require devitrification to form a strong and hermetic seal.

It is a further object of this invention to provide sealing glasses which provide effective seals at greatly reduced time-temperature conditions.

BRIEF DESCRIPTION OF THE INVENTION

Application Ser. No. 901,467, the disclosure of which is incorporated herein by reference described sealing glasses which are non-devitrifiable in the sense that essentially no crystallization occurs when the glass is exposed to a temperature of 430° C. for a period of 15 minutes. Under the sealing conditions required to produce a seal with these glasses, which are commonly about 400° C. temperature and 5 to 8 minutes time, no crystallization is observed and the glass in the completed seal is vitreous.

Application Ser. No. 901,467 describes novel sealing mixtures containing glasses capable of being intimately mixed with large amounts of a wide variety of fillers with minimal effect on glass flow at the sealing temperature while effecting a substantial decrease in the coefficient of thermal expansion of the mixture. Thus vitreous glass seals characterized by high mechanical strength, good chemical stability, low coefficients of expansion and capable of withstanding repeated thermal shocks (MIL-STD-883) specifications) are achieved with these novel low temperature sealing glass compositions (360°–430° C.).

The glasses described in Application Ser. No. 901,467 are very fluid, very low melting glasses produced in the lead borate and lead zinc borate glass forming systems by the joint addition of cuprous oxide and fluorine ($Cu_2$+F) in concentrations of 0.1 to 10 percent by weight, the molar ratio of cuprous oxide to fluorine being in the range of 1:0.25 to 1:10, preferably in the range of 1:1 to 1:5. The resulting glass can be made even more fluid by the addition of up to 5 percent by weight bismuth oxide ($Bi_2O_3$). The preferred glass compositions are characterized by a DTA softening point in the range of 260°–280° C. linear thermal expansion coefficients of the order of $105$–$110 \times 10^{-7}$/°C., remarkable water insolubility, resistance to steam, good glass flow even in a nitrogen atmosphere and the ability of being admixed with large quantities of filler(s) in particulate form while retaining high fluidity at low temperatures.

In accordance with Application Ser. No. 901,467 a particulate filler is admixed in amounts reaching 56 percent by volume preferably 5 to 50% by volume to tailor the thermal expansion of the resulting sealing glass to a value as low as $50 \times 10^{-7}$/° C. The particulate fillers employed are refractory or semirefractory powders which are any such well known materials, synthetic or natural, conventional in the art and also include materials prepared from glass, recrystallized glass, glass-ceramics, coprecipitated or sintered materials.

The glasses of Application Ser. No. 901,467 contain lead oxide, optionally zinc oxide, boron oxide, optionally bismuth oxide, silicon dioxide, cuprous oxide and a minor proportion of at least one solid non-volatile fluoride, the proportions being lead oxide 75 to 85% by weight, zinc oxide when present up to 10% by weight and preferably below 8% by weight, boron oxide 8 to 15% by weight, silicon dioxide 0.75 to 2.5% by weight, bismuth oxide when present 1 to 5% by weight, cuprous oxide 0.5 to 5.5% by weight, and non-volatile metal fluoride in amounts such that the mol ratio of cuprous oxide to the fluoride content of the metal fluoride is in the range 1:0.25 to 1:10.

The completed seal obtained with these mixtures consist of finely divided refractory particles dispersed in a vitreous glass matrix.

It has now been found that by minor modification of the glasses of Application Ser. No. 901,467 by incorporation of from 0.1 to 3.0% by weight of alumina in the glass compositions and by mixing these glasses so modified in finely divided form with finely divided tetragonal lead titanate sealing glass compositions are obtained which have low melting points, ca 400° C., have high fluidity when melted, do not devitrify when exposed to 430° C. for 15 minutes and cooled to ambient temperature and have coefficients of thermal expansion well below $100 \times 10^{-7}$/° C. This combination of properties makes possible the production of sound stable seals rapidly (5–8 minutes) at low temperature (ca 400° C.).

DETAILED DESCRIPTION OF THE INVENTION

The following examples describe preparation and composition of the sealing glass compositions of the invention.

EXAMPLE 1

A base glass was prepared by mixing 4150 grams of red lead oxide ($Pb_3O_4$), 300 grams lead fluoride, 300 grams zinc oxide, 800 grams boric acid, 50 grams silica, 120 grams cuprous oxide, 80 grams bismuth trioxide and 44.4 g of Aluminum hydroxide. After heating the mixture in a platinum crucible at 1000° C. for 20 minutes the melt was poured through cold steel rollers to facilitate subsequent crushing. The resulting glass flakes had a composition in weight percent as follows:

| | |
|---|---|
| PbO | 80.1 |
| ZnO | 5.55 |
| $B_2O_3$ | 8.34 |
| $SiO_2$ | 0.92 |
| $Cu_2O$ | 2.22 |
| $Bi_2O_3$ | 1.48 |
| F | 0.86 |
| $Al_2O_3$ | 0.50 | and a corresponding molar ratio $Cu_2O$:F of 1:3, and a DTA softening point=258° C.

EXAMPLE 2

A base glass was prepared according to Example 1 but having the aluminum hydroxide content of the initial mixture increased to 106.5 g. The composition of the finished base glass in weight percent was:

| | |
|---|---|
| PbO | 79.5 |
| ZnO | 5.51 |
| $B_2O_3$ | 8.28 |
| $SiO_2$ | 0.92 |
| $Cu_2O$ | 2.20 |
| $Bi_2O_3$ | 1.48 |
| F | 0.86 |
| $Al_2O_3$ | 1.20 |

The base glass had a DTA softening point of 263° C.

EXAMPLE 3

A series of physical blends of −150 mesh (70% less than 400 mesh) ground glass example 1 and 10–30 micron tetragonal lead titanate powder were prepared by intimate mixing. Each blend was pressed in the form of rods, melted at about 400° C. for a few minutes and the linear thermal expansions measured. The resulting decrease of the linear thermal expansion with increasing lead titanate content was as follows:

| % by Volume $PbTiO_3$ | Coefficient of Thermal Expansion × $10^7$/°C. |
|---|---|
| 25 | 83 |
| 30 | 78 |
| 35 | 74 |
| 40 | 69 |
| 45 | 65 |
| 50 | 61 |

EXAMPLE 4

Base glass of example 2 was ground to a particle size such that 70% by weight of the particles are less than about 400 mesh.

A sealing glass powder was prepared by physically blending 60% by volume of ground base glass example 1 with 40% by volume lead titanate powder of a particle size in the 10–30 micron range, preferably 20 microns. A conventional double cone rotary blender may be used to produce the intimate mixing.

The resulting sealing glass powder was formed into a printing paste by admixing it with an organic vehicle (example: Terpineol 318, Hercules Corporation), the paste consisting by weight ratio about 90% powder and 10% vehicle. The resulting paste was screen printed on opaque and ultraviolet radiation transmitting alumina lids (sintered UV transparent or single crystal sapphire), dried and preglazed in a continuous belt furnace with its maximum temperature set at 380° C. for about one minute to melt the sealing glass material. The thickness of the fused glass layer was of the order of 6 to 8 mils. The glazed alumina lids were inverted and held in position by the pressure exerted by a metal clip to a conventional microelectronic alumina base. The structure was heated at a rate of 100° C. per minute to a peak of 390°–400° C. for 1 to 5 minutes then cooled at a rate of 60° C. per minute to room temperature to produce a tight, strong vitreous seal.

Suitable organic vehicles for use in producing pastes are thermally stable organic liquids boiling in the range about 150°–250° C. Alpha terpineol carbitol acetate, butyl carbitol are representative suitable vehicles. The tetragonal lead titanate filler employed has a negative coefficient of expansion, $-53 \times 10^{-7}$/°C. and may be used in amounts such that it constitutes up to 50 percent by volume of the base glass-filler mixture. The very low thermal coefficients of expansion shown in Example 3 appear to be attributable in large part to the contribution of the lead titanate to the base glass-filler mixture.

In order to obtain the beneficial properties which attend the use of the lead titanate filler the base glass must have an alumina content in the range 0.1 to 3% by weight, preferably in the range 0.5 to 2.0% by weight. If base glasses identical with those of Examples 1 and 2 are prepared except that the alumina component is omitted it is found that mixtures of such glasses with lead titanate do not produce the high quality seals obtained in Example 4 and do not have the low coefficients of expansion obtained in Example 3. When alumina is omitted the solubility of lead titanate in the base glass appears to be greatly increased with the result that crystallization of lead titanate from the molten mixture occurs when the molten mixture is cooled to solidification. Loss of strength and elevation of the coefficient of expansion result.

I claim:

1. A sealing glass composition which does not devitrify when exposed to a temperature of 430° C. for a period of 15 minutes, consisting essentially of a mixture of (a) a finely divided base glass which is a homogeneous mixture containing about 75–85 wt.% lead oxide, about 8–15 wt.% boron oxide, 0 to 10 wt.% zinc oxide, 0.75% to 2.5% silicon dioxide, 0 to 5 wt.% bismuth oxide, 0.5 to 5.5 wt.% cuprous oxide, 0.1 to 3 wt.% alumina and a non-volatile metal fluoride in amount such that the mol ratio of cuprous oxide to the fluoride content of the metal fluoride is in the range 1.0:0.25 to 1:10 and (b) finely divided tetragonal lead titanate, the lead titanate constituting from 10 to 50% by volume of the mixture.

2. The composition of claim 1 wherein the zinc oxide content of the base glass is in the range 3 to 8 wt.%.

3. The composition of claim 2 wherein the bismuth oxide content of the base glass is in the range 1 to 5 wt.%.

4. The composition of claim 1 wherein the alumina content by the base glass is in the range 0.5 to 2.0 wt.%.

5. The composition of claim 1 wherein the metal fluoride component of the base glass is lead fluoride, cuprous fluoride, zinc fluoride or mixtures of at least two of said metal fluorides.

6. A printing paste consisting essentially of a mixture of the composition of claim 1 and a thermally stable organic liquid boiling in the range about 150°–250° C.

7. A glass, metal or ceramic body having its surface covered by a hermetic sealing coat formed by covering its surface with finely divided composition of claim 1, heating the thus covered body to about 400° C., holding the body at such temperature for several minutes and then cooling it to ambient temperatures.

* * * * *